US012067599B2

(12) United States Patent
Tzucker (10) Patent No.: US 12,067,599 B2
(45) Date of Patent: Aug. 20, 2024

(54) METHOD AND SYSTEM FOR RATING CONSUMER PRODUCTS (71) Applicant: Ofer Tzucker, Givatayim (IL)

(72) Inventor: Ofer Tzucker, Givatayim (IL)

( * ) Notice: Subject to any disclaimer, the term of this patent is extended or adjusted under 35 U.S.C. 154(b) by 0 days.

(21) Appl. No.: 16/600,510

(22) Filed: Oct. 13, 2019

(65) Prior Publication Data
US 2021/0110443 A1   Apr. 15, 2021

(51) Int. Cl.
*G06Q 30/0282*   (2023.01)
*G06F 3/04847*   (2022.01)

(52) U.S. Cl.
CPC ..... *G06Q 30/0282* (2013.01); *G06F 3/04847* (2013.01)

(58) Field of Classification Search
CPC ............... G06F 3/04847; G06Q 30/0282
See application file for complete search history.

(56) References Cited

U.S. PATENT DOCUMENTS

| | | | | | |
|---|---|---|---|---|---|
| 8,249,915 | B2 * | 8/2012 | Iams | ............. | G06Q 10/0639 705/7.32 |
| 2008/0071602 | A1 * | 3/2008 | Ojakaar | ........ | G06Q 30/0278 705/14.44 |
| 2009/0192808 | A1 * | 7/2009 | Sela | ............. | G06Q 30/02 705/1.1 |
| 2011/0276512 | A1 * | 11/2011 | Asikainen | ...... | G06Q 30/0282 707/723 |
| 2012/0209751 | A1 * | 8/2012 | Chen | ............. | G06Q 30/06 705/27.2 |
| 2014/0172744 | A1 * | 6/2014 | El-Hmayssi | .... | G06Q 30/0282 705/347 |
| 2017/0046752 | A1 * | 2/2017 | Diester | ......... | G06Q 30/0282 |
| 2018/0047071 | A1 * | 2/2018 | Hsu | ............. | G06Q 30/0282 |
| 2019/0318407 | A1 * | 10/2019 | Giridhari | ........ | G06N 20/00 |
| 2020/0151795 | A1 * | 5/2020 | Figliulo | ........ | G06F 7/02 |

* cited by examiner

*Primary Examiner* — Andrew T Chiusano
(74) *Attorney, Agent, or Firm* — Rivka Friedman

(57) ABSTRACT

A computer-implemented method for rating a consumer product or service, the method including: calculating, by a computer system comprising at least one computer in a network comprising at least one processor, a lay rating from at least one rating score built from several weighted parameters, provided by a respective lay consumer; calculating, by the computer system, an expert rating calculated from at least one rating score built from several weighted parameters provided by a respective expert; receiving, by the end user, using the computer system, a selection of a respective weight for each of the lay rating and the expert rating by an end-user via a graphic user interface (GUI); calculating, by the computer system, a total rating as a result of a weighted average biased according to the respective weights selected by the end-user; and displaying, by the computer system, the total rating on the GUI.

9 Claims, 4 Drawing Sheets

METHOD AND SYSTEM FOR RATING CONSUMER PRODUCTS

FIELD OF THE INVENTION

The present invention relates to the field of e-commerce in general, and to the field of consumer product ratings on the Internet in particular and, more specifically, to a method and system for combining expert opinions and lay opinions into an innovative rating system.

BACKGROUND OF THE INVENTION

There are websites and brick and mortar stores that use customer rating only (e.g. www.amazon.com, www.ebay-.com etc.) and there are websites and stores that provide expert opinions and ratings (e.g. www.top9rated.com), and there are sites that show both audiences (e.g. www.rottentomatoes.com). However there is no mechanism or process for combining lay and expert opinions in a meaningful way.

SUMMARY OF THE INVENTION

In the instant application there is provided a new method and system for rating consumer products and services whereby the scores (ratings) given by the general public are coupled with scores given by a team of experts to give a single rating. An innovative algorithm provides a weighted average between the two groups.

There is currently no rating tool that scores a particular product by combining the scores given by lay users and those given by a team of experts and also allows the user to regulate what weight is given to each party (lay and expert).

Furthermore, there is no set standard of relevant measurements that are scored in order to rate a product. There is therefore disclosed herein a standard for rating products and services and a method and system for implementing the same. Still further, there is innovatively disclosed herein a method for weighting each measurement according to importance and providing a weighted mean as the product score.

According to the present invention there is provided a computer-implemented method for rating a consumer product or service, the method including: (a) calculating, by a computer system comprising at least one computer in a network comprising at least one processor, a lay rating from at least one rating score provided by a respective lay consumer; (b) calculating, by the computer system, an expert rating calculated from at least one rating score provided by a respective expert; (c) receiving, by the computer system, a selection of a respective weight for each of the lay rating and the expert rating by an end-user via a graphic user interface (GUI); (d) calculating, by the computer system, a total rating as a result of a weighted average biased according to the respective weights selected by the end-user; and (e) displaying, by the computer system, the total rating on the GUI.

According to further features in preferred embodiments of the invention described below the rating score is an average calculated, by the computer system, from one or more scores provided for one or a plurality of parameters.

According to still further features in the described preferred embodiments the average is a weighted mean biased according to predefined weightings for each of the plurality of parameters.

According to still further features the lay ratings is a result of calculating by the computer system, an arithmetic mean of the rating scores from the at least one lay consumer and the expert rating is a result of calculating by the computer system, an arithmetic mean of the rating scores from the at least one expert.

According to still further features the selecting of the respective weight is effected by the end-user by moving a handle along a slider in the GUI, wherein one side of the slider indicates the expert rating and another side of the slider opposite the one side represents the lay rating.

According to still further features the plurality of parameters define a rating standard and consist of 5 parameters: (i) a degree of enjoyment derived using the product or service; (ii) a measure of quality of the product or service; (iii) a degree of suitability of the product or service to a customer; (iv) a measure of contribution of the product or service to growth of the customer; and (v) a degree by which a cost of the product or service fits a benefit of the product or service.

According to still further features the average is a weighted mean biased according to predefined weightings for each of the plurality of parameters. The bias may be defined by the user or an administrator.

According to another embodiment there is disclosed a computer-implemented method for providing a standardized rating scheme, the method including: (a) displaying, in a graphic user interface (GUI) in communication with a computer system via a network, a request for rating a product or service, the request including a rating scale for each of five parameters consisting of: (i) a degree of enjoyment derived using the product or service, (ii) a measure of quality of the product or service, (iii) a degree of suitability of the product or service to a customer, (iv) a measure of contribution of the product or service to growth of the customer, and (v) a degree by which a cost of the product or service fits a benefit of the product or service; (b) receiving, by the computer system via the GUI, a respective score for each of the five parameters according to the rating scale; (c) calculating, by the computer system, an average from the scores; wherein the computer system comprises a processor, a storage operationally coupled to the processor and a utility software program executable on the processor for calculating the average; and (d) storing the scores and the average on the storage.

According to still further features the average is a weighted mean biased according to predefined weightings for each of the five parameters. According to still further features the predefined weightings are defined by an administrator of the computer system or by the customer.

According to still further features the predefined weightings include: (i) 30% for the degree of enjoyment, (ii) 20% for the measure of quality, (iii) 20% for the degree of suitability, (iv) 20% for the measure of contribution, and (v) 10% for the degree by which the cost of the product or service fits the benefit of the product or service.

According to another embodiment there is disclosed a computer system for rating a consumer product or service, including: at least one computer in a network, the computer including: a processor; a storage coupled to the processor, the storage for storing a database; a utility software program executable on the processor for dynamically rating the product or service, the utility software program including: a graphic user interface (GUI) module, an account management module, a scoring module, and a rating module; wherein the rating module includes at least one algorithm for calculating a weighted average from a lay rating and an expert rating according to weightings selected by an end-user.

According to still further features the rating module further includes an algorithm for calculating a weighted mean from a respective score for each of five parameters, wherein each of the five parameters has a predefined weight.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

James Surowiecki, in his book "The Wisdom of Crowds" (Surowiecki, 2004), presented a study described that in 91% of cases, the masses provide a correct answer to the problem presented to them. But in order for this to be true, the group must be heterogeneous and independent among its members.

This is not the case in rating systems today, where, for example, a particular product can be rated by people who have an invested business interest or an abnormal distribution behavior for example only young people, or a majority of men or women. As such, the uncontrolled audience ratings cannot be fully trusted.

Thus current rating systems that are based only on lay ratings are most likely biased. In addition there is also no special regulation which requires proper disclosure of the raters or which requires some parabolic or other dispersal of the demographic characteristics of the rater group.

As far as expert ratings are concerned, the success rate of experts (i.e. individuals with the relevant level of education and knowledge in the specific area) in providing a solution to a given problem (or an accurate score for a particular product) according to Surowiecki is only 65%. Therefore, an expert rating alone is not satisfactory.

Given the aforementioned, there is a high likelihood that the ratings that are currently based only on the wisdom of the masses or only on expert ratings are fundamentally biased. Therefore, a combination of crowd and expert ratings is expected to provide a more accurate and correct solution to product and service ratings.

As a solution to the aforementioned problem, the instant innovation provides a new rating method, which relies on the incorporation of both groups. There is disclosed hereafter an interface that will, for the first time, allow the end user to decide what weight he or she gives the expert team and to the general audience.

Glossary of Terms

To prevent confusion, the terms that follow have been assigned the correlating meanings, within the instant application. Where the context and/or specific details contradict the glossary, the context and/or details control.

The terms "general public", "consumers", "lay individuals", "crowd", "masses", variations and combinations thereof all refer to clientele who have purchased, used or know the product or service being discussed. These are lay individuals who have a personal experience (or secondhand information) and a subjective and potentially biased opinion based on their experience.

A "team of experts", "expert group", "expert" or "expert participant" refers to one or more individuals who are clearly experts in the specific area of the product or service. For example, individuals who have an MA in the relevant field and have 10 years of work experience in the relevant field.

Examples of professionals who can be considered experts in the children's games industry include: developmental psychologists, speech therapists, educational consultants, parent coaches, art therapists, child development experts etc.

A "weighted" average is also known as a weighted arithmetic mean and is similar to an ordinary arithmetic mean (the most common type of average), except that instead of each of the data points contributing equally to the final average, some data points contribute more than others. In the instant application, the user is able to select what weight to give lay opinion and what weight to give the expert opinion. As such, the concept is not a mere combination of rating values divided by the number of ratings but rather an algorithm that calculates the weighted average between the lay and expert opinions as defined or selected by the individual user.

The term "parameter", as used herein, refers to indices/metrics/measurements/categories by which a product is scored. Specifically, the aforementioned parameters refer to the five metrics whose scoring creates a well-rounded review for the product or service.

The "five-parameter standard" is the standard proposed herein for rating a product or service. The standard consists of the five parameters: Joy, Quality, Suitability, Contribution and Cost benefit, as defined above.

The term "score" or "value"—refers to a rating score for a specific parameter (where there is more than one parameter), e.g. a score from 1 to 10 for the parameter "Joy".

The term "weighted mean" is used herein to refer to a total score for an individual rater (lay or expert) received by calculating an average of scores/values for the parameters. In embodiments, the weighted mean is a regular average, i.e. the weights between the values are equal. In preferred embodiments, the average is a weighted mean with pre-defined biases, i.e. where the weight or bias of the values are not all equal. The weights of the parameters are predefined by the administrator and cannot be changed by the end-user. The result of the weighted mean calculation is termed herein a "rating score". Alternatively, the weights/biases may be defined by the end-user.

The term "arithmetic mean" is used herein to refer to an average of multiple values calculated without any value having a greater or smaller weight that any other value. This is a regular average.

The term "lay rating" refers herein to the arithmetic mean of all the lay consumers individual weighted means (total score for a product from a lay consumer).

The term "expert rating" refers herein to the arithmetic mean of all the expert individual weighted means (total score for a product from an expert).

The term "weighted average" is used herein to refer to a calculation that is performed on a lay rating and an expert rating to provide a weighted average from the two values where the weight or bias of each value is selected or defined by the end-user. The term "weighted average" is not to be confused with the term "weighted mean" even though the terms literally mean the same thing, the context is different for each term, hence the distinction.

The terms "total rating", "compound score/rating", "composite score/rating" is used herein to refer to the result of calculating the weighted average of the lay rating and the expert rating where the weight or bias of each value (lay or expert rating) is defined by the end-user.

Standardized Product Review

In addition, the new method also defines a specific set of five parameters for standardizing product reviews. At the base of the theory behind the method for standardizing product reviews are five metrics for calculating a product's score. Providing a value for each metric or parameter creates a well-rounded review for the product or service. The metrics are:

a) the degree of enjoyment derived using the product (Joy);
b) the quality of the product (Quality);
c) the degree of suitability of the product to the customer (Suitability);
d) the measure of contribution of the product to the growth of the customer (Contribution);
e) the degree by which the cost fits the benefit of the product or service (Cost benefit).

In addition, the new method also defines the unique weight of each of the five indices and thus defines their importance. The weights are currently defined as follows: Product enjoyment—30%; product quality—20%; product suitability—20%; contribution of the product to the growth of the customer—20%; price of the product (in terms of cost vis-a-vis benefit)—10%. In embodiments, the predefined weight of each index/parameter can be altered by an administrator based on new information (e.g. based on results of an academic research study or a survey).

The system and method first and foremost create a more reliable, more accurate, and customized product rating system. The rating system also provides a competitive business advantage, in terms of originality, innovation, as well as an added value to the general public.

To summarize, the instant method and system has at least four innovative aspects:

(1) a new method and system for rating consumer products by providing a combination score based on scores from the lay public and scores from expert staff (hereinafter: the "composite rating"), the scores may be based on a single parameter, a plurality of parameters or the five-parameter standard disclosed herein;

(2) defining a set of five parameters/metrics for standardizing product reviews: enjoyment, quality, suitability, contribution to growth, price cost benefit;

(3) a predefined weight for each of the aforementioned metrics according to which the system calculates a weighted average (the weighted average of each individual score is not to be confused with the user-selected, weighted average calculated between the consumer public and the expert team.); and (4) a volume-bar type feature that is a user-selectable weighting mechanism by which an end-user defines the relative weight given to each of the consumer scores and expert scores. The innovative algorithm for calculating the improved rating score is built of the four, aforementioned, components.

Rating Method and System

The principles and operation of an improved rating method and system according to the present invention may be better understood with reference to the tables, drawings and accompanying description.

Figure 1:
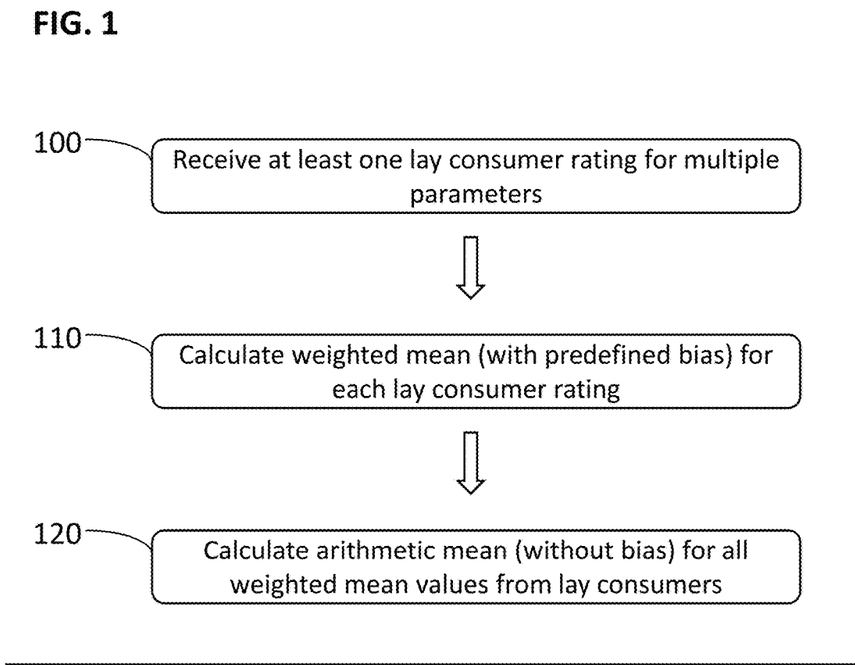
FIG. 1 is a flow diagram of the process for receiving a lay consumer rating.

According to the instant method and system, the first step in the rating system is for the individual consumer to rate the product and calculate a consumer rating. FIG. 1 is a flow diagram of the process for receiving a lay consumer rating. At Step 100 the system receives a lay consumer score for a product or service, via a GUI. The user provides a single score for the product or service or, alternatively, a score or value for each of a plurality of parameters (e.g. the standardized five parameters).

At Step 110, the values for the parameters provided by the lay consumer/s are processed to calculate a weighted mean for each lay consumer. The resulting weighted mean is termed a rating score. The bias employed when calculating the weighted mean is predefined by the administrator of the site. The end-user cannot influence the weights of the weighted mean. However, in some embodiments, the end-user may be able to select the weights. The end-user may or may not be aware of the weights (bias) used for the aforementioned calculation.

A Step 120, one or more weighted means, which is/are the rating score/s, from one or more lay consumer are processed to calculate an arithmetic mean (without bias) of all the lay consumers' rating scores in order to return a lay rating.

Figure 3:
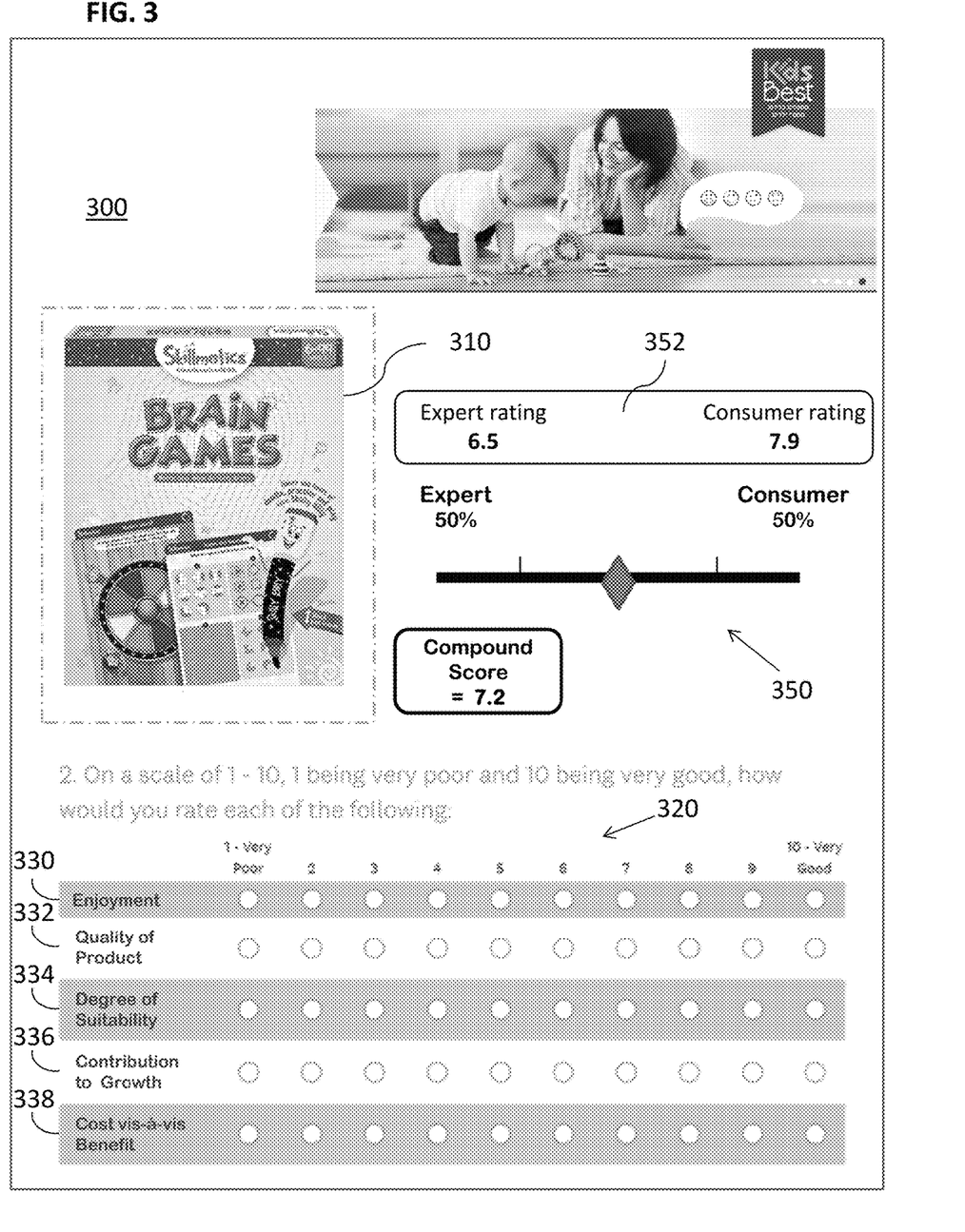
FIG. 3 is an illustration of an exemplary GUI website page 300 for rating a product.

FIG. 3 is an illustration of an exemplary GUI website page 300 for rating a product. The product is an exemplary box game 310 for children. A box game is a game that comes in a box. Many board games, such as Monopoly®, come in a box. Such games are referred to herein as box games. Below the picture of the box game is a set of rating scales 320 for the product. The rating scale is numbered from 1 (very poor) to 10 (very good) with an individual scale for each of five different parameters or metrics 330, 332, 334, 336, 338.

According to the example, a first lay consumer, referenced User 1, is presented with a Graphic User Interface (GUI) that displays a product for review and a correlating interface with five parameters, where each parameter has a scoring option of one to ten. It is made clear that while the five parameters presented here are preferable, it is understood the invention includes within its scope any range from a single parameter to a plurality of parameters of any number.

User 1 provides a score for each of the exemplary parameters: Joy 330, Quality 332, Suitability 334, Contribution to growth 336 and Cost benefit 338. Additional users are able to provide feedback (i.e. scores) in a similar manner via respective instances of the aforementioned webpage interface.

Table 1 lists values from three lay users. The table includes five columns for each of the parameters, a row including the predefined weight of each parameter and a sixth column with a weighted average for each lay user.

TABLE 1

| Weight % | Joy 30% | Quality 20% | Suitability 20% | Contribution 20% | Cost benefit 10% | Wd mean |
|---|---|---|---|---|---|---|
| User 1 | 10 | 8 | 8 | 6 | 10 | 8.4 |
| User 2 | 8 | 6 | 8 | 10 | 6 | 7.8 |
| User 3 | 8 | 4 | 8 | 8 | 10 | 7.4 |

In the above Table 1, each user provides a score from 1 to 10 for each of the five parameters (e.g. using the GUI of FIG. 3 or any similar interface). A weighted mean is calculated for each user, based on the predefined weights given to each parameter. A regular average (arithmetic mean without bias) is then calculated by adding all the weighted means (wd mean) together and dividing by the number of users. Based on the above, the average score (referred to herein as the lay rating) from the general population of lay consumers as exemplarily represented by user 1, user 2 and user 3, is 7.9.

The webpage further displays the mechanism 350 for selecting the weighted average. Preferably, the GUI also displays the expert and lay ratings 352, as well as the total rating. However, in some embodiments, the GUI may not display the expert and lay ratings 352. The second step of the instant rating system is to calculate an expert rating where an expert participant or team rate/s the product or service. The same system used for the lay consumers is used to calculate a weighted mean for each member of the expert team and then an arithmetic mean for all the members together.

Figure 2:
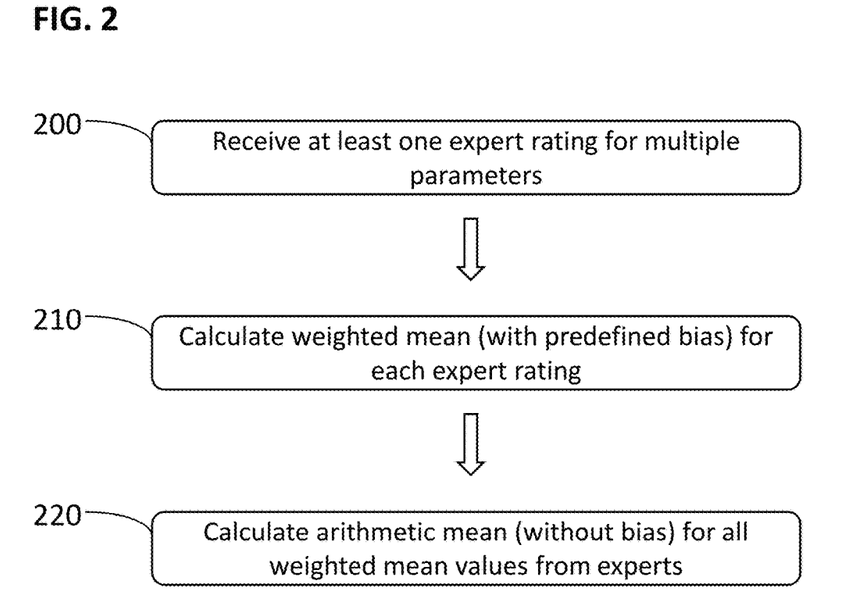
FIG. 2 is a flow diagram of the process for receiving an expert rating.

FIG. 2 is a flow diagram of the process for receiving an expert rating. At Step 200 the system receives a score from at least one expert for a product or service, via the GUI (e.g. accessed by the expert using a login for expert contributors). Each expert provides a single score for the product or service or, alternatively, a score or value for each of a plurality of parameters. The lay consumers and expert participants use the same scoring parameters for a given product.

At Step 210, the values provided by the expert or experts are processed to calculate a weighted mean for each expert participant. The resulting weighted mean is termed a rating score, as above. The biases employed when calculating the weighted mean is predefined by the administrator of the site. The end-user cannot influence the weights of the weighted mean. The end-user may or may not be aware of the weights (biases) used for the aforementioned calculation.

A Step 220, one or more weighted means, which is/are the rating score/s, from one or more expert participants are processed to calculate an arithmetic mean (without bias) for all the expert scores/members in order to return an expert rating.

Table 2 lists values from two experts. The table has the same parameters as Table 1.

TABLE 2

| Weight % | Joy 30% | Quality 20% | Suitability 20% | Contribution 20% | Cost benefit 10% | Wtd Ave |
|---|---|---|---|---|---|---|
| Expert 1 | 6 | 6 | 10 | 8 | 4 | 7.0 |
| Expert 2 | 4 | 8 | 6 | 6 | 8 | 6.0 |

The weighted mean for Expert 1 is 7.0 and for Expert 2 it is 6.0. Therefore the total (regular) average (arithmetic mean without bias) for the expert team, i.e. the expert rating for the given product, is 6.5.

The third step in the process is to select the weight given to each group when calculating the weighted average between the lay and expert groups. The system receives this selection that is made via the GUI. By default, the lay group and the expert group each contribute 50% of the total average. This is in fact a regular average (arithmetic mean). According to the exemplary values provided above, the total rating score would be 7.2, based on the calculation: (7.9+6.5)/2=7.2.

Innovatively, the end-user can select (e.g. using a horizontal volume bar feature described hereafter) a greater weight for one group, automatically lowering the corresponding rate for the other group. For example, the end-user can select a greater weight for the expert score, thereby lowering the weight of the lay score correspondingly, e.g. 75% for the expert score and 25% for the general public score. Table 3 lists a set of results for each of the weights 0%, 25%, 50%, 75% and 100% for each of the groups. The 25% intervals are merely exemplary. It is understood that any interval or gradient between 0% and 100% is within the scope of the invention.

TABLE 3

| Expert weight | Lay weight | Compound Score |
|---|---|---|
| 100% | 0% | 6.5 |
| 75% | 25% | 6.8 |
| 50% | 50% | 7.2 |
| 25% | 75% | 7.5 |
| 0% | 100% | 7.9 |

Figure 4A:
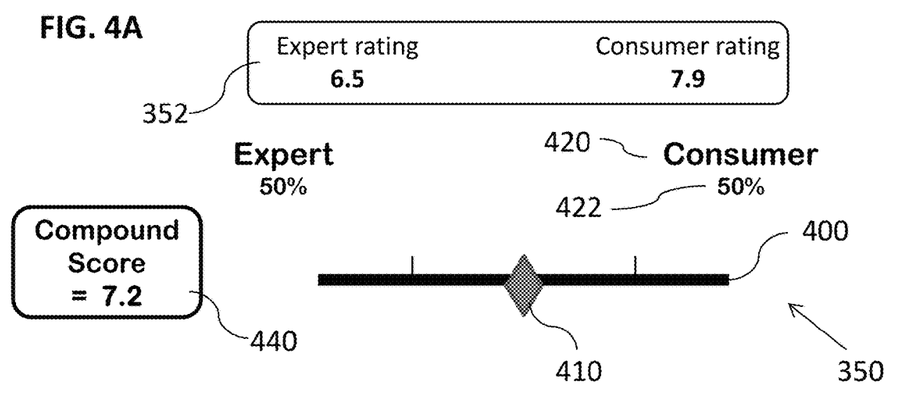
FIGS. 4A, 4B and 4C are exemplary representations of a weight selection mechanism for the weighted average of the composite rating.
Figure 4B:
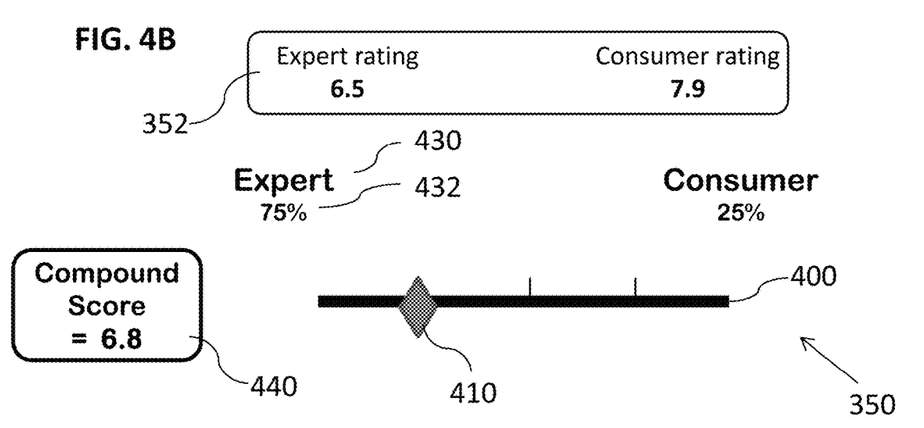
Figure 4C:
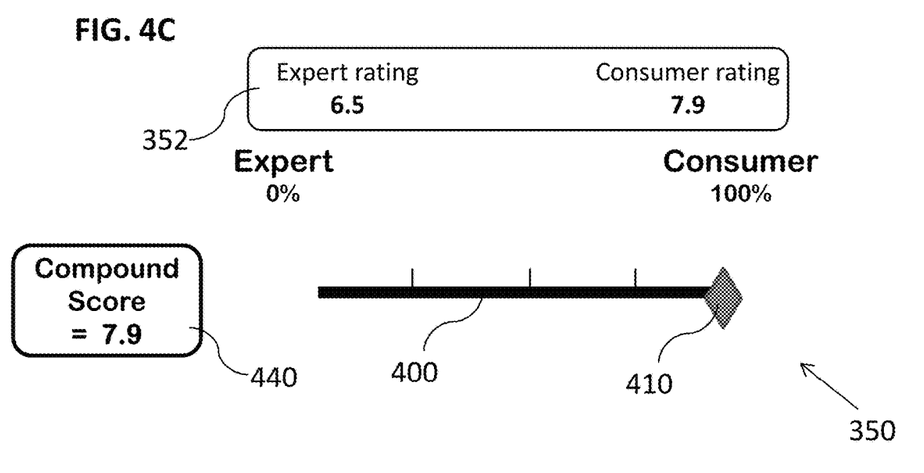

The fourth step of the process is to calculate the total rating or compound score as a result of a weighted average biased according the respective weights selected by the end-user, e.g. by manipulating handle 410 along slider 400.

FIGS. 4A, 4B and 4C are exemplary representations of a weight selection mechanism 350 for the weighted average of the composite rating. In one exemplary embodiment, the method and mechanism of selecting the weight for each group is with a volume bar. The volume bar includes a slider object 400 represented within the GUI (e.g. FIG. 3). In the instant GUI implementation, the weight value is selected by moving a handle 410 on the slider 400. On one side of the slider is a representation of the lay group (general public, consumers) 420 and on the other side of the slider is a representation of the expert group 430. The slider is a horizontal track disposed between and/or beneath the indicia representing the two groups. A handle is disposed on or in the track. The user manipulates the handle towards one of the sides as desired, thereby changing the weights of each group correspondingly. Preferably, a section of the indicia for each of the groups includes the weight (e.g. a percentage) 422, 432 given to each group.

The fifth step of the process is to display the compound score in the GUI. FIG. 4A illustrates the slider 400 with the handle at the midpoint. The lay/consumer group has a 50% weight and the expert group has a 50% weight. In this exemplary scenario, the weighted average is the same as a regular average. The total rating or compound score following the exemplary depictions and tables is displayed on the GUI at box 440. The compound score is 7.2.

FIG. 4B illustrates an example whereby the handle 410 is three-quarters of the way towards the Expert end 430 of the slider. The weight 432 of the expert rating is 75% and the weight 422 of the lay rating is 25%. The compound score 440 is 6.8.

FIG. 4C illustrates an example whereby the handle 410 is all the way at the lay/consumer end 420 of the slider. The weight 422 of the lay rating is 100% and the weight 432 of the expert rating is 0%. The compound score 440 is 7.9. It is made clear that the volume bar is merely an example of a weight selection mechanism and is not intended to be limiting in any way.

Preferably, the process and system is implemented in an e-commerce environment. A typical e-commerce environment would be a website that displays an array of products, usually including a picture of the product as well as a short description. An e-commerce site will also include a price tag for the product. Within the description is usually a customer rating scheme or an expert rating scheme. There are often customer reviews that accompany a rating given by the customer and an overall customer rating showing the relative breakdown of the scores. For example, with the standard five-star rating system, the summary displays a graph which illustrates the numbers or percentages of reviews for each star; i.e. X number or percent of reviewers gave one star, Y number or percent of reviewers gave two starts etc. up to five stars.

By contrast, the instantly described rating system has various metrics that can be displayed. The first metrics are the number of individuals in each group, i.e. the number of consumers from the general, lay public that have rated the product or service; and the number of experts that have rated the product. Another set of metrics are the averages (arithmetic mean) for each of the parameters of the standardized five parameters (not shown). Another set of metrics is the arithmetic mean for each group (see FIG. 3). The final set of metrics is the range of weighted averages of the combined scores of the lay and expert groups. The latter set being defined by the end-user as detailed above.

It is clear from all the foregoing that the standardized five-parameter rating system and the user self-tuning of lay-expert weights is a new phase and a significant innovation and improvement over the current product and service rating systems. Common rating systems used for both products and services the five-star and 10 point rating systems. In some cases the rating system includes sub-categories or features that are rated individually, and the overall score is a straight mean of the ratings for these features. However each of these sub-categories or features is product specific and selected by the administrator. There is no standardization for rating products. As such, the instantly presented five-parameter self-tuning lay-expert rating system is already a great improvement over the existing and commonly used rating systems.

The weighted averages of the lay users and expert team disclosed herein are a significant innovation over the existing rating systems for a consumer product or service. In the common rating systems, only regular averages (arithmetic mean) are used, not weighted averages.

Collecting scores from both lay users and experts is yet another improvement over a vast majority of the rating systems which usually provide either lay or expert scores but not any combination of them both.

Lastly, the composite or compound score that is calculated according to an end-user selection of weight distribution between the two groups is a clearly innovative concept and profound improvement over the state of the art.

Figure 5:
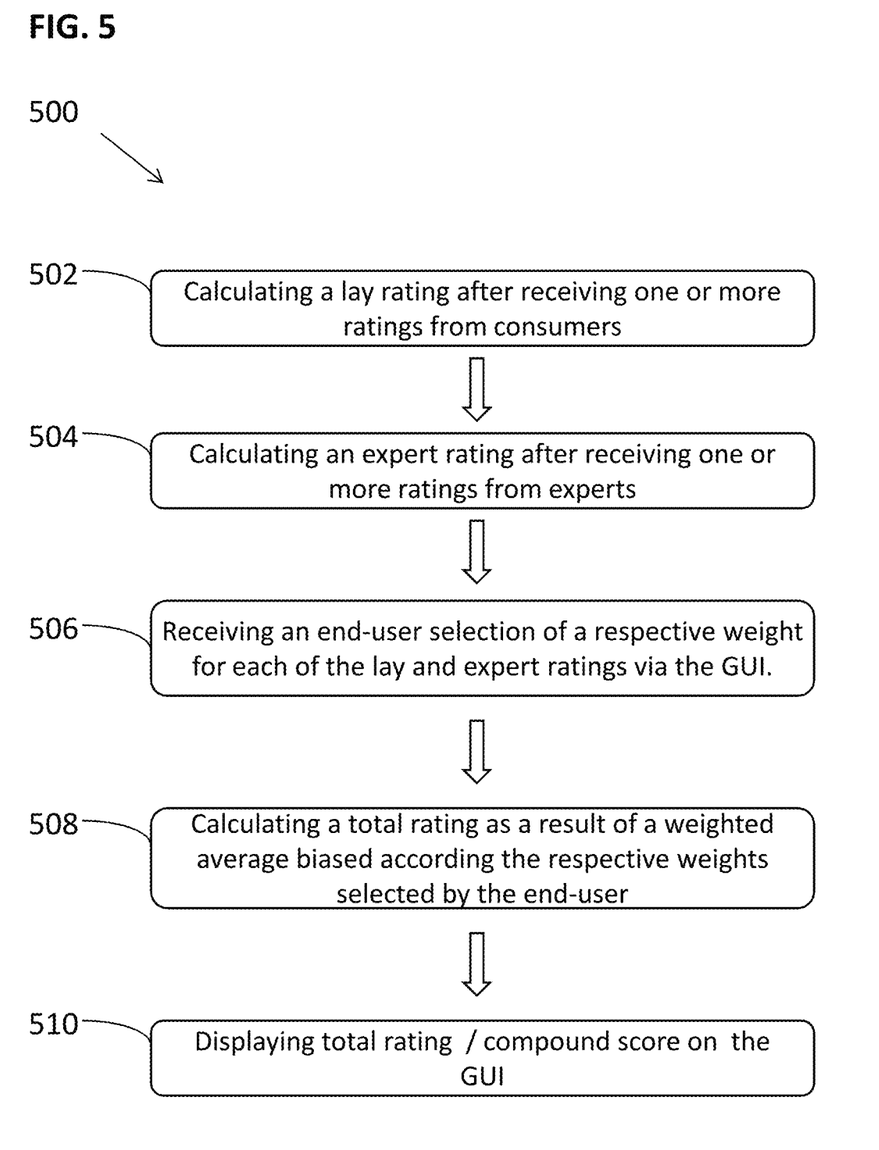
FIG. 5 is a flow chart of the innovative process.

FIG. 5 is a flow chart of the innovative process 500 according to the steps described heretofore. In the first step 502 of the process, the system calculates a lay rating when one or more lay consumers rates the product or service. The rating process is detailed in FIG. 1 and an exemplary rating interface is shown in FIG. 3.

In the second step 504 the system calculates an expert rating when an expert participant or team to rate/s the product or service. The process for calculating the expert rating is depicted in FIG. 2.

In the third step 506 the system receives an end-user selection of a respective weight for each of the lay rating and the expert rating via the GUI. The selection process is depicted in FIGS. 4A-4C.

In the forth step 508 the processor calculates a total rating/compound score for the product/service as a result of a weighted average biased according the respective weights selected by the end-user in the third step 506.

In the fifth step 510, the processor of the system displays the total rating, also referred to as the compound score, in the GUI.

In preferred embodiments, the GUI is implemented on a website on a network, e.g. the Internet. The website may have a desktop version and a mobile device version, both designed and implemented to display the same information and receive the same types of input. Additionally or alternatively, the GUI may be implemented in a mobile application that accesses the same databases and data as the website versions. For the sake of brevity and clarity, the description that follows will refer specifically to the implementation of the GUI in a website on the Internet. However, it is made clear that all of the details, descriptions, components and processes detailed hereafter with reference to the website are intended to apply equally to the mobile website version and the mobile application version of the system.

The website is hosted on the Internet which is a network of networks. There are three types of potential users of the website: an end-user, an expert participant and a lay consumer.

The expert participant is a user that has a login (username and password) and a corresponding account on the website. The account details and all information pertaining to the specific expert participant are stored on a database on the website server. By logging in, the user identifies themselves as an expert and is granted the rights and permissions of an expert, namely to provide an expert rating. The manner of rating a product or service has been discussed above. The manner of calculating the expert score (from a team of experts) has been discussed above.

The lay consumer is a user of the website, and usually one that has purchased a product or service via the website. The lay consumer identifies themselves on the site either during the purchase process or by using a login. In the latter case, the user will have an account corresponding to the login. The account (or other process of identification, such as payment) identifies the lay consumer, and provides the consumer with various permissions and rights, including the right to rate a product or service. The lay consumer identification and/or login and corresponding account are stored in the database on the website server.

The end-user may be an expert participant, a lay consumer or a guest user who is browsing the website but does not have an account on the system. The end-user is able to view all the products or services and see the ratings. The ratings include a "crowd rating" (average rating from all lay consumers, as discussed above), an "expert rating" (average rating from all expert participants, as discussed above) and a "compound rating"/"composite rating" (weighted average rating, as discussed above). The end-user, innovatively, can manipulate the rating slider in order to select the desired weights of the crowd and expert opinions, resulting in the user-selected composite rating.

There is disclosed herein a computer system for rating a product or service on a network-based Graphic User Interface (e.g. a website displayed on a computer terminal, an app on a mobile phone, etc.). The computer system includes a processor, a storage coupled to the processor, the storage for storing a database. The computer system further includes a utility software program executable on the processor.

The utility software program includes a GUI module, an account management module, a scoring module and a rating module. The GUI module is configured for providing instances of the GUI on local terminals. The account management module is configured for handling logins, rights, permissions and accounts for lay and expert users. The scoring module handles the raw scoring data, weight/bias values as well as the calculated data for the various averages. The rating module includes algorithms for: calculating the weighted means (weighted mean with predefined biases) from the lay and expert scores for the parameters, calculating the lay and expert ratings (arithmetic mean without bias), calculating in real time the total ratings where the weighted average biases are updated in real time according to the end-user selection on the remote local terminal. All of the scores and averages are saved on the database and the calculations are performed by the processor. All the values of the lay and expert scores, and the end-user selection of the biases are updated in real time from a multitude of remote (local) terminals connected via the network While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A computer-implemented method for providing a standardized rating scheme, the method comprising:
   (a) displaying, in a graphic user interface (GUI) in communication with a computer system via a network, labels for a group of specified parameters and a request for rating a product or service, said request including a rating scale across all products and services for each of the group of specified parameters, the group consisting of:
      (i) a degree of enjoyment derived using said product or service,
      (ii) a measure of quality of said product or service,
      (iii) a measure of contribution of said product or service to growth of said customer, and
      (iv) a degree by which a cost of said product or service fits a benefit of said product or service;
   (b) receiving, from both experts and lay consumers, by said computer system via same said GUI, a respective rating score for the product calculated from values given for all of same said specified parameters in the group, according to said rating scale;
   (c) calculating, by said computer system, an average derived from all of said rating scores, for all of the experts and the lay consumers; wherein said computer system comprises a processor, a storage operationally coupled to said processor and a utility software program executable on said processor for calculating said average;
   (d) storing a set including all of said rating scores and said average on said storage;
   (e) calculating, by a computer system comprising at least one computer in a network comprising at least one processor, a lay rating derived from all of said rating scores provided by said lay consumers;
   (f) calculating, by the computer system, an expert rating derived from all of said rating scores provided by said experts;
   (g) receiving, by the computer system, a selection of a respective weight for said lay rating and for said expert rating by an end-user via a graphic user interface (GUI);
   (h) calculating, by the computer system, a total rating as a result of a weighted average biased according to said respective weights selected by said end-user; and
   (i) displaying, by the computer system, said total rating on said GUI,
   wherein said selecting of said respective weight is effected by said end-user by moving a handle along a slider in said GUI, wherein one side of said slider indicates said expert rating and another side of said slider opposite said one side represents said lay rating.

2. The computer-implemented method of claim 1, wherein said average is a weighted mean biased according to predefined weightings for each of said plurality of parameters.

3. The computer-implemented method of claim 1, wherein said lay ratings is a result of calculating by the computer system, an arithmetic mean of said rating scores from said at least one lay consumer and said expert rating is a result of calculating by the computer system, an arithmetic mean of said rating scores from said at least one expert.

4. The computer-implemented method of claim 1, said average is a weighted mean biased according to predefined weightings for each of said plurality of parameters.

5. The computer-implemented method of claim 1, wherein said average is a weighted mean biased according to predefined weightings for each of said specified parameters.

6. The computer-implemented method of claim 5, wherein said predefined weightings are defined by an administrator of said computer system.

7. The computer-implemented method of claim 5, wherein said predefined weightings are defined by said customer.

8. A computer system for rating a consumer product or service, comprising: at least one computer in a network, said computer including:
   a processor;
   a storage coupled to said processor, said storage for storing a database;
   a utility software program executable on said processor for dynamically rating the product or service, said utility software program including:
   a graphic user interface (GUI) module configured to present to an end-user a request for rating the product or service across all products and services, said request including displaying labels for a group of specified parameters and a rating scale for each of the group of specified parameters the group consisting of:
      (i) a degree of enjoyment derived using said product or service,
      (ii) a measure of quality of said product or service,
      (iii) a measure of contribution of said product or service to growth of said customer, and
      (iv) a degree by which a cost of said product or service fits a benefit of said product or service,
   an account management module,
   a scoring module, and
   a rating module;
   wherein said rating module includes at least one algorithm for calculating a weighted average from a lay rating for the group of specified parameters calculated from all rating scores, which are each averaged from values given for all of said parameters in the group, provided by lay consumers via the GUI and an expert rating for the group of specified parameters calculated from all rating scores provided by experts via a same said GUI, for all same said parameters in the group wherein the weighted average is calculated according to a respective weight selected by an end-user for each of the lay rating and the expert rating; and
   wherein said selecting of said respective weight is effected by said end-user by moving a handle along a slider in said GUI, wherein one side of said slider indicates said expert rating and another side of said slider opposite said one side represents said lay rating.

9. The computer system of claim 8, wherein said rating module further includes an algorithm for calculating a weighted mean from a respective score for each of said specified parameters, wherein each of said specified parameters has a predefined weight.

* * * * *